United States Patent [19]

Anciaux et al.

[11] Patent Number: 5,054,348

[45] Date of Patent: Oct. 8, 1991

[54] DEVICE FOR SHEARING A GROUP OF TUBES

[75] Inventors: Ghislain Anciaux, Champagnac la Riviere; René Guilloteau, Verrieres le Buisson; Daniel Tucoulat, Cormeilles en Parisis; Pascal Chauvire, Paris, all of France

[73] Assignee: Societe Generale Pour les Techniques Nouvelles S.G.N., Saint Quentin en Yuelines, France

[21] Appl. No.: 366,671

[22] Filed: Jun. 15, 1989

[30] Foreign Application Priority Data

Jun. 15, 1988 [FR] France .......................... 88 08029

[51] Int. Cl.⁵ .................. B23D 23/00; B26D 7/06
[52] U.S. Cl. .................................. 83/157; 83/268; 83/419; 83/694; 83/930
[58] Field of Search ............... 83/930, 147, 157, 160, 83/282, 468.5, 694, 167, 356.2, 409.2, 415, 356.3, 262, 268, 176, 410.9, 419; 252/626, 627; 376/260, 463

[56] References Cited

U.S. PATENT DOCUMENTS

| | | |
|---|---|---|
| 2,303,880 | 7/1941 | Hilton et al. ........................... 83/147 |
| 3,722,338 | 3/1973 | Cherel ................................ 83/930 X |
| 3,777,601 | 12/1973 | Strandell ............................... 83/160 |
| 3,855,684 | 12/1974 | Kendall .............................. 83/930 X |
| 4,091,699 | 5/1978 | Chaze et al. ............................ 83/56 |
| 4,095,495 | 6/1978 | Chaze et al. ....................... 83/268 X |
| 4,245,532 | 1/1981 | Astill et al. ....................... 83/930 X |
| 4,510,832 | 4/1985 | Guilloteau ............................ 83/168 |
| 4,566,361 | 1/1986 | Dubost et al. ......................... 83/454 |

Primary Examiner—Douglas D. Watts
Assistant Examiner—Kenneth E. Peterson
Attorney, Agent, or Firm—Staas & Halsey

[57] ABSTRACT

A saddle with two cutting stations, i.e., front and rear openings, moves forward and backward horizontally within a chassis. The rear opening includes a cutting blade. The chassis includes a front counter blade. A magazine holds a tube bundle and includes a rear face clamp and rear counter blade. In a first cutting operation, skirting at the base of the tube bundle is placed in the front opening and is cut by first moving the saddle rearward against the rear face clamp and rear counter blade, and then frontward against the front counterblade. In a second cutting operation, the tube bundle is placed in the rear opening. As the saddle is moved frontward, the cutting blade in the rear opening cooperates with the front counter-blade on the chassis to cut the tubes. This second cutting operation is continued until the tubes are cut.

19 Claims, 3 Drawing Sheets

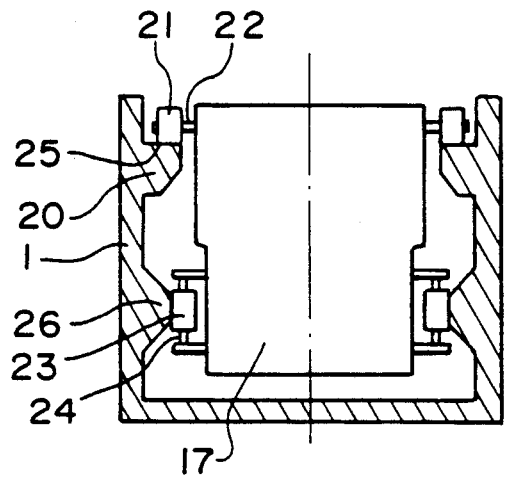
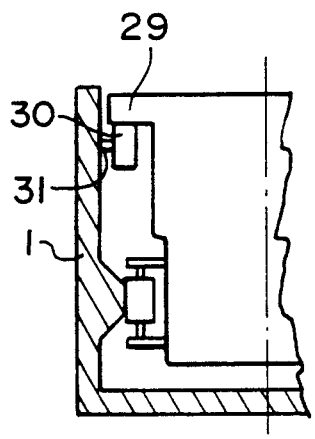
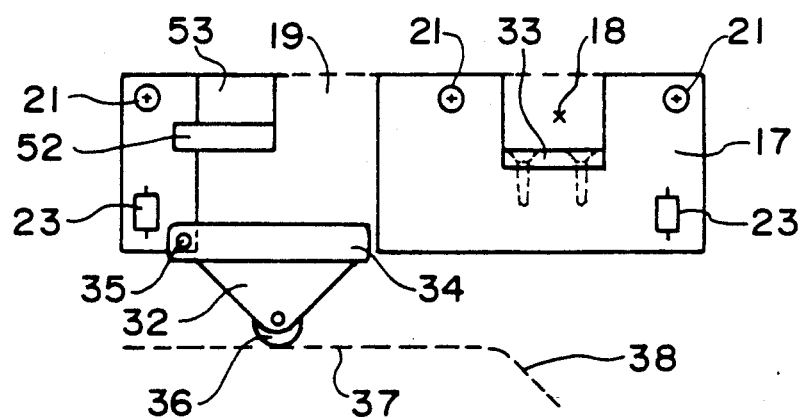
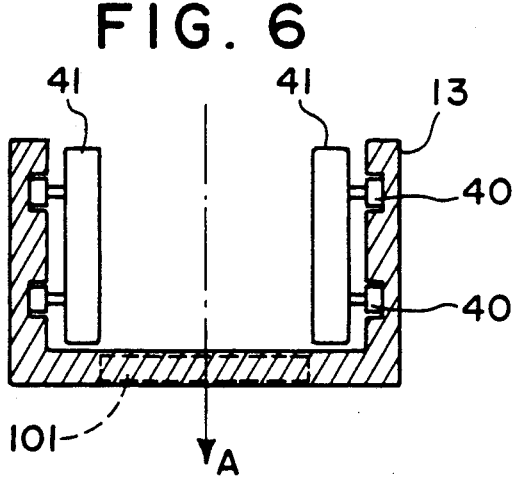

DEVICE FOR SHEARING A GROUP OF TUBES

BACKGROUND OF THE INVENTION

After their extraction from a nuclear reactor, nuclear fuel elements are stored for a while in a pool for a first cooldown in radioactivity. One is then confronted with the choice of storing or recycling.

To facilitate storage, it is desirable to reduce the bulk of the fuel structure by separating the needles or rods containing the fuel into one group, and any mechanical structure (base or head end sections, guide tubes, supporting grids, etc.) in another.

The above structure has previously been made radioactive by its passage inside the reactor (neutron activity causing the presence of cobalt 60 created by naturally-occurring nickel), but is hardly contaminated, if at all. To limit the space occupied by this structure, it is worthwhile cutting it into pieces which are then stored in canisters.

The reprocessing cycle starts by the shearing of fuel elements in view of dissolving the fuel present in the rods.

It is thus apparent that in most cases a shearing operation is called for along the way.

Devices used for implementing these operations include a shear and a magazine for supplying the shear.

It is here reminded that the fuel elements for PWR or PWA type reactors, i.e., the most widespread type, are formed from a bundle of rods (diameter of the order of a centimeter, length: several meters, number: several hundreds) arranged in parallel and maintained between two fairly massive end pieces.

Thin sheet metal grids are provided between the end pieces to maintain the spacing between the rods.

It is also common practice to have a sheet metal skirting soldered to the base end piece surrounding the base of the fuel bundle.

Shears for fuel elements have already been described. U.K. Patent GB 1 314 803 describes a so-called horizontal shear in which the fuel elements are placed in a horizontal position for cutting.

French Patent 75 27897 describes a shear in which the fuel elements can be cut out.

It is noted that all of these devices are formed by a chassis in which a saddle is displaceable in an alternating rectilinear movement. The saddle bears a cutting blade on its front face and the chassis contains a fixed counter blade, further frontward. The cutting blade and front counter blade define the cutting plane.

The cutting mode is always identical: the saddle is moved rearward, the fuel element is brought forward between the cutting blade and front counter blade so as to extend beyond the cutting plane by a given amount. The saddle is moved forward and the cutting blade cuts the rods in cooperation with the front counter blade, which prevents them from moving backwards. The saddle is moved rearward, and the cycle is repeated. To facilitate the cutting operation, the bundle is compressed by one or several lateral face clamps that prevent the rods from escaping the cutting action.

The Applicant has noticed that the first cutting operation, which separates the base end section from the rest of the structure, was very awkward. In particular, the presence of a skirting introduces a fault in the cutting operation: the entire rear portion of the skirting is not cut but pushed back into the upper plane of the end piece.

This is owing to the fact that the cutting blade, which is intended to cut perpendicularly to the length of the fuel rods, is not capable of cutting the skirting.

SUMMARY OF THE INVENTION

A feature of the present invention is not to cut both the end piece and the skirting with the cutting blade.

An important feature of the present invention is the presence of two cutting openings on the saddle, one opening for cutting the end piece (this shall be termed the front opening) and another opening for cutting the rods and guide tubes (this shall be called the rear opening).

Another feature of the invention is in the vertical position of the bundle within a fixed magazine having a vertical axis, the two cutting functions (end section—bundle) being carried out in two different travels of the saddle.

The cutting plane in the present invention is horizontal and is defined by a cutting blade and front and rear counter blades.

BRIEF DESCRIPTION OF THE DRAWINGS

Other characteristics and advantages of the present invention will come to light in the following description of specific embodiments with reference to the appended figures in which:

FIG. 3: transversal view of the saddle

FIG. 4: transversal cross-sectional view of the saddle

FIG. 5: longitudinal schematic cross-sectional view of the saddle

FIG. 6: horizontal cross-sectional view of the lower part of the magazine

DETAILED DESCRIPTION OF THE PREFERRED EMBODIMENTS

Figure 1:
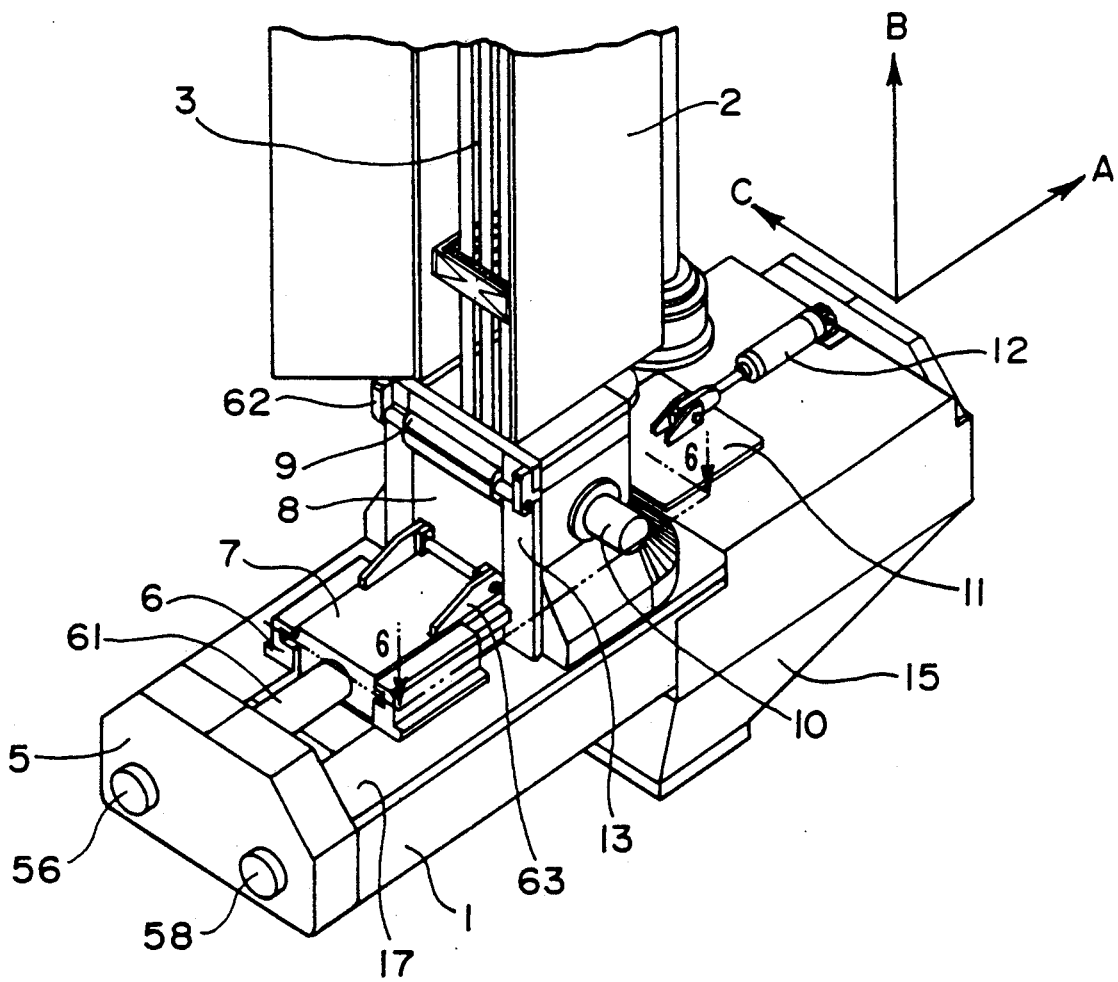
FIG. 1: general three-quarter view

References shall be made to the following directions:

The element to be cut is vertical, above the shear. Arrow B is vertical.

Saddle displacement is rectilinear and horizontal. The forward direction is the direction in which the cutting blade 53 fixed on the saddle cuts the rods from the structure. Arrow A shows the forward direction. It shall be explained further that a partial cutting operation on the skirting is carried out in a rearward motion.

Arrow C shows the left direction.

The horizontal cutting plane is defined by the upper face of the cutting blade and the lower faces of the front and rear counter blades.

The plane of arrows A and C is horizontal.

The shearing device is generally composed of a chassis 1 having an open U-section at its upper portion.

A vertical magazine 2 is affixed to the chassis 1 and contains the elements 3 to be cut. The base end piece is at the bottom; the head end section (when it has not been previously severed) (not shown) is at the top portion.

The chassis 1 contains a guided slide referred to as a blade-carrying saddle 17 (abbreviated to saddle). The saddle 17 is guided so as to have a rectilinear end alternating motion with reduced friction.

The magazine 2 has a rear face 8 and two mobile faces.

A description of the chassis 1 can be followed from FIG. 1. The chassis 1 is composed of a framework of longitudinal beams and spacers, or portions, such as a rear wall 5. The upper face of the chassis 1 is open. A movable lid 11 can partially shut this open face. The lid 11 can be aotuated by a jack 12. The chassis 1 has two guiding systems for the saddle 17, shown schematically in FIG. 3.

Rails 20 ensure horizontal travel of the saddle 17 while rails 26 ensure parallel travel with the saddle 17 axis.

An alternative guiding system is explained at the end of this description.

The rear wall 5 of the chassis 1 is formed as a solidly-ribbed wall.

Since this wall 5 is submitted to the cutting forces (several tens of tons) it is necessary for it to have significant mechanical strength.

The lower portion of the chassis 1 ends in a funnel 15.

Inside the chassis 1, on each of the two lateral faces, is provided a horizontal ramp 37 on its rear portion, sloping down towards the front portion 38.

This ramp 37 cooperates with a flap 34, as shall be explained further.

Figure 2:
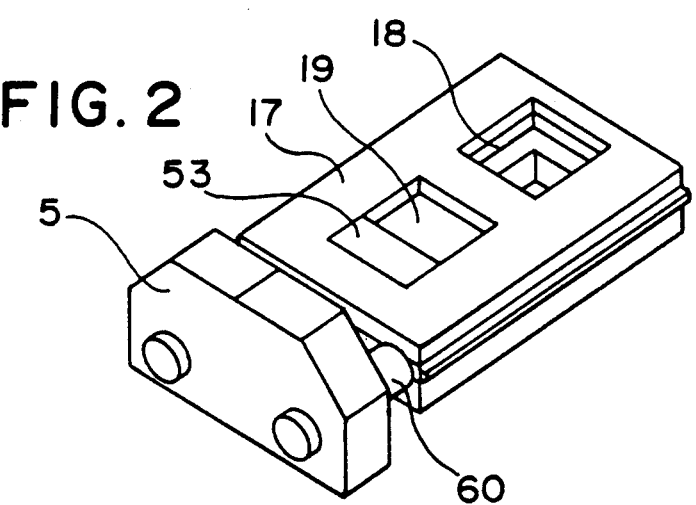
FIG. 2: three-quarter view of the saddle

FIG. 2 shows a three-quarter view of the saddle 17.

As can be seen, the saddle 17 has the general shape of a sliding drawer inside the chassis 1. The upper face has two openings:

the front opening 18, which is closed at its lower portion and the rear opening 19, which is open at its lower portion, but which can be temporarily shut by the flap 34.

Note that in the saddle 17 displacement, the upper face of the saddle 17 is in the same plane as the cutting plane.

FIG. 5 is a longitudinal cross-sectional view of the saddle 17 which allows the internal details of the openings 18, 19 to be functionally explained.

The base end section must fit exactly in height within the front opening 18.

As a matter of fact, the depth of the front opening 18 is greater than that dimension and, for each type of fuel, there is provided a shim 33 that is screw-mounted to the bottom of the opening 18.

In the rear opening 19, which is open on its rear face, is fixed the support 52 for the blade 53. The latter is recessed inside the rear face 19 and held by a system of screws (not shown).

The blade 53 is affixed to the support 52 such that the upper face of the blade 53 is exactly in the cutting plane.

The lower portion of the rear opening 19 is open, but the flap 34 that is rotatably movable around axis 35 can shut this lower portion; its function shall be explained along with that of the operation of the shears. The flap 34 contains, at its right and left, two arms 32 supporting a roller 36.

This roller rolls along ramp 37 of the chassis 1.

The purpose of the flap 34 and the ramp 37 shall be explained with the rest of the operation.

The saddle 17 has two sets of rollers 21, 23 (symmetrical with respect to the longitudinal plane) on its two lateral faces. See FIGS. 3 and 4.

The top rollers 21, of which there are three sets (preferably), have a horizontal axis 22 and roll on a top part 25 of the chassis rails 20.

The bottom rollers 23, of which there are at least two sets, have a vertical axis 24 and roll on the vertical part of chassis rails 26.

Note that it is quite possible to exchange the positions of the rails 20, 26 and rollers 21, 23 without changing the result obtained, i.e., saddle 17 guidance. For example, FIG. 4 shows top rails 29 fixed to the saddle 17 and top rollers 30 fixed to the chassis by axis 31.

Likewise, it is possible to replace the rollers 21, 23, 30 with sliders and obtain the same results.

Forward and rearward displacement of the saddle 17 inside the chassis 1 is ensured in a simple manner by one or two two-way jacks 56, 58 having a horizontal axis 60.

Preference is given to jacks located symmetrically with respect to the longitudinal symmetry plane, for better balancing of the forces.

If it is wished to reduce the total length of the chassis 1—and hence of the shear—one solution would be to bore the body of the said cylinders in the saddle 17, and to have the rod of each jack behind the saddle 17 pressed against the rear wall 5 of the chassis 1 via a ball joint 57, 59.

The magazine 2 has a prismatic shape with a vertical axis and straddles the upper face of the chassis 1. It is screw mounted to the chassis 1. The said magazine 2 is shown in FIG. 1.

The magazine 2 has a bottom portion 13 and a top portion 43, whose respective functions are different.

The magazine 2 serves to maintain the fuel bundle in a vertical position and to compress the bundle during the cutting process, to prevent the rods from twisting. A device forming part of the magazine 3 brings down the fuel between each cutting operation. The bottom 13 of the magazine 2 is formed as a rectangular prism in which slides the fuel bundle with little play. It is therefore understood that the magazine 2 is specific to a given type of fuel.

A rear face 8 of the bottom part 13 of the magazine 2 is movable and serves as a face clamp. FIG. 1 shows how this rear face 8 can be pushed by a jack to reduce the cross-section at the bottom of the magazine 2. It can be seen from the Figure that this movable portion has a different displacement for its top and bottom edges. The rear face 8 is articulated at the top around an axis 9 that can be displaced within a vertical slider 62.

At the bottom of rear face 8, two squaring elements 63 are articulated and fixed to a sliding slot in the grooves of slides 6 (fixed to the chassis 1). The jack 61 advances or retracts the slide 7.

The top edge remains in the vertical plane of the rear face 8 of the magazine 2 by means of two slides, whereas the bottom edge remains parallel to the cutting plane and at a constant distance.

The front face of the lower part of the magazine bears a front counter blade 101, the lower planar portion of which is horizontal and in the cutting plane.

The right and left lateral faces of the bottom portion 13 of the magazine are shown in FIG. 6. By studying the right face, for example, it can be seen that it is formed by a wall 41, on which rubs the fuel bundle. This wall 41 is movable parallel to itself by means of a plurality of short-travel jacks 40 pressed against a fixed vertical wall 13.

The purpose of this movable wall 41 (at the right and left) shall be explained with the rest of the operation.

The top part 43 of the magazine 2 has a prismatic shape that extends from the bottom part 13 of the section.

Figure 7:
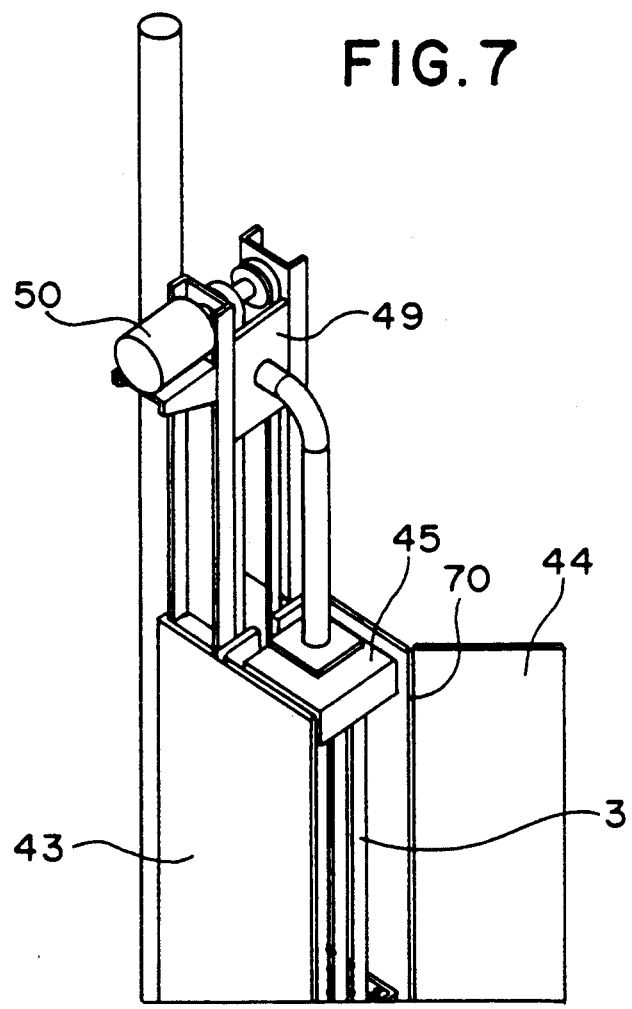
FIG. 7: three-quarter view of the top part of the magazine.

This top portion 43 is shown in FIG. 7. It can be seen here that the rear face 44 has the shape of a door opening by means of a hinge 70. This facilitates the introduction of fuel bundles.

It is suggested, for a fuel bundle of approximately 5 meters length, to share the height with 0.5 meters for the bottom portion 13 of the magazine and 4.5 meters for the top portion 13.

At the upper portion of the top part 43 of the magazine 2 there is provided a pushing element in the form of a horizontal plate 45 that is slidable inside the magazine 2 and set in motion by a vertical plate 49 (driven by a motor 50). This plate 49 can apply a downward pushing force on the fuel bundle when the motor 50 is energized.

Alternatively, a pneumatic driver could be used supplied with compressed air when required. An electric motor equipped with a reduction gear can also be used.

EXAMPLE 1 cutting a base end section (skirting)

The saddle 17 is placed such that the front opening 18 is located beneath the magazine 2.

A position detector can easily be placed on the chassis 1 to ensure the correct positioning of the saddle 17.

The fuel bundle is inserted inside the magazine 2 (by the lateral door), the base end section dropping into the front opening 18 of the saddle. The shim 33 placed at the base of the opening 18 has been selected so that the upper horizontal portion of the base end section comes out just at the level of the cutting plane.

The face clamp 8 jack 61 is activated to hold the bundle, and the saddle 17 is then moved rearwards by 20 or 30 mm. In this way, the base of the face clamp 8 and counter blade act on the skirting and separate the rear face of the skirting from the base end section (by ripping away the welding points).

The saddle 17 is then moved forward up to the point where the front opening 18 draws the base end section under the front counter blade 101 attached to the chassis 1, causing the base end section to be completely separated from the rod bundle. Also, by virtue of the preceding maneuver, the skirting is completely removed from the base end section.

There remains to withdraw the end section; a grapple seizes hold of and raises the end section, the saddle 17 is moved back and the end section is lowered into a canister via the funnel 15.

EXAMPLE 2 cutting a bpe e 50551928.UFL undle

This cutting operation occurs after cutting the base end section. The saddle 17 is placed so that the rear opening 19 is beneath the magazine 2.

The flap 34 is in the high position, thanks to the chassis 1 ramp 37.

The face clamp 8 is untightened and the two lateral walls 41 are moved apart from the lower portion of the magazine 2 by means of the short-travel jacks 40 (1 cm is sufficient).

The bundle drops under its own weight until it touches the flap 34. The pushing element 45 is simultaneously activated and, if need be, assists in the downward motion.

The flap 24 has a dual role: to prevent the bundle from dropping too far and to adjust the cutting length. This implies that the flap 34 needs to be changed if a different cutting length is desired.

The jacks 40 from the lower lateral portions of the magazine 2 are activated and then by the face clamp 8 jack 61 is activated to compress all the rods.

Due to the actuation of the two jacks 56, 58, the saddle 17 is moved forward: the cutting blade 53 of the saddle cooperates with the front counter blade 101 (at the front face of the magazine) to sever all the rods at the chosen length.

Note that all the pieces remain in the rear opening, on the flap 34, when the saddle 17 moves forward, until the chassis 1 ramp allows the flap 34 to incline and empty the cut pieces into the funnel 15.

The saddle 14 is moved back and all the preceding operations are repeated until no more fuel remains.

What is claimed is:

1. A device for shearing a group of tubes, including at least a base end section, said group of tubes being placed in a magazine, said shearing of the tubes being carried out, after cutting of said base and section, comprising:
   the magazine being oriented vertically and receiving the tubes vertically;
   a chassis including a counter blade connected thereto; and
   a blade bearing saddle mounted for forward and backward rectilinear and horizontal movement on the chassis, said blade bearing saddle including
   at an upper portion thereof, a front opening, closed at a lower portion thereof, said front opening receiving said base end section and allowing withdrawal of the base end section, after cutting of the base end section by said counter blade, during the forward and horizontal movement of the blade-bearing saddle; and
   a rear opening, including a cutting blade, for receiving and cutting the tubes by moving the blade-bearing saddle forward rectilinearly and horizontally within the chassis, said tubes being compressed near to a horizontal cutting plane by a clamp, said cutting blade cooperating with the counter blade fixed on the chassis to cut the tubes, said rear opening being temporarily closable by a movable flap which prevents the group of tubes from dropping too far and allows adjustment of the cutting length; said movable flap being articulated about a horizontal axis perpendicular to the direction of movement of the blade-bearing saddle; and said flap being supported on either side by an arm positioned beneath said flap, said arm terminated by a roller on a ramp, fixed to the chassis.

2. The device according to claim 1, wherein the ramp is horizontal at a rear portion thereof and downwardly extending at a front portion thereof, wherein, in the travel of the flap towards the front of the blade-bearing saddle the flap closes the rear opening until the tubes are cut, the tubes bearing on said flap while being cut, and then swings open so as to allow cut tube pieces to fall towards a funnel.

3. The device according to claim 1, wherein the magazine has a lower part having a variable cross-section and an upper openable part having a constant rectangular cross-section.

4. The device according to claim 3, wherein lateral faces of the lower part of the magazine move while remaining vertical through the action of a plurality of short-travel jacks.

5. The device according to claim 3, wherein a rear face of the lower part of said magazine adopts an oblique position through a jack to constitute the clamp.

6. The device according to claim 3, wherein the rear face of an upper part of the magazine opens via a hinge to allow lateral loading of said group of tubes in said magazine.

7. The device according to claim 1, wherein the blade-bearing saddle is displaced by two jacks having a horizontal axis and placed symmetrically between a wall of the chassis and the blade-bearing saddle.

8. The device according to claim 7, wherein a body of each of the jacks is machined in the blade-bearing saddle and a rod of each of said jacks is attached to a wall of the chassis by a ball joint.

9. The device according to claim 1, wherein the blade bearing saddle includes a plurality of rollers having a horizontal axis and rolling along horizontal rails fixed to the chassis.

10. The device according to claim 1, wherein the chassis has on two lateral faces thereof, a plurality of rollers having a horizontal axis and being horizontally aligned and that the blade-bearing saddle has a horizontal rail on each lateral face thereof, wherein said rails rest on said rollers.

11. The device according to claim 1, wherein a shim is fixed to a bottom of the front opening which allows adjustment of the depth of said opening.

12. A device for shearing fuel elements placed vertically in a magazine, the shearing being carried out by moving a cutting blade mounted on a blade-bearing saddle forward and backward rectilinearly within a chassis, said blade-bearing saddle, comprising:
at an upper portion thereof, two openings that are substantially rectangular; a front opening, closed at a lower portion thereof, intended for cutting a base end section of the fuel elements, and a rear opening, open at a lower portion thereof, that is temporarily closable by a movable flap and intended for cutting the fuel elements,
wherein the movable flap is articulated about a horizontal axis perpendicular to the movement of the saddle, and said flap is supported on sides thereof by an arm beneath the flap and terminated by a roller on a ramp fixed to the chassis.

13. The device according to claim 12, wherein the ramp is horizontal at a rear portion thereof and downwardly extending at a front portion thereof, the change in direction being located so that, in the travel towards the front, the flap shuts the rear opening up to the end of the cutting operation, then swings to allow the cut fuel element pieces to fall towards a funnel.

14. A device for shearing fuel elements placed vertically in a magazine, the shearing being carried out by moving a cutting blade mounted on a blade-bearing saddle forward and backward rectilinearly by within a chassis, the blade-bearing saddle comprising:
at an upper portion thereof, two openings that are substantially rectangular: a front opening, closed at a lower portion thereof intended for cutting a base end section of the fuel elements, and a rear opening open at a lower portion thereof, that is temporarily closable by a movable flap and intended for cutting the fuel elements,
wherein a cutting plane is horizontal and is defined by an upper surface of the cutting blade placed in the rear opening and by a lower surface of front and rear counter blades, the front counter blade being fixed to the chassis and the rear counter blade being fixed to the magazine, and
wherein the movable flap is articulated about a horizontal axis perpendicular to the movement of the saddle, and said flap is supported on sides thereof by an arm beneath the flap and terminated by a roller on a ramp fixed to the chassis.

15. A device for shearing fuel elements placed vertically in a magazine, the shearing being carried out by moving a cutting blade mounted on a blade-bearing saddle forward and backward rectilinearly within a chassis, the blade-bearing saddle comprising:
at an upper portion thereof, two openings that are substantially rectangular; a front opening, closed at its lower portion, intended for cutting the base end section and a rear opening, open at a lower portion thereof, that is temporarily closable by a movable flap and intended for cutting the fuel elements,
wherein the blade-bearing saddle is moved by two jacks having a horizontal axis and placed symmetrically between a wall of the chassis and the blade bearing saddle, and
wherein the movable flap is articulated about a horizontal axis perpendicular to the movement of the saddle, and that said flap is supported on sides thereof by an arm beneath the flap and terminated by a roller on a ramp fixed to the chassis.

16. A device for shearing fuel elements placed vertically in a magazine, the shearing being carried to by moving a cutting blade mounted on a blade-bearing saddle forward and backward rectilinearly within a chassis, the blade-bearing saddle comprising:
at an upper portion thereof, two openings that are substantially rectangular: a front opening, closed at a lower portion thereof intended for cutting a base end section of the fuel elements and a rear opening, open at a lower portion thereof, that is temporarily closable by a movable flap and intended for cutting the fuel elements,
wherein the blade-bearing saddle is displaced by two jacks having a horizontal axis and placed symmetrically between a wall of the chassis and the blade bearing saddle,
wherein a body of each of the jacks is machined in the blade-bearing saddle and a rod of each of the jacks is attached to a wall of the chassis by a ball joint, and
wherein the movable flap is articulated about a horizontal axis perpendicular to the movement of the saddle, and said flap is supported on sides thereof by an arm beneath the flap and terminated by a roller on a ramp fixed to the chassis.

17. A device for shearing fuel elements placed vertically in a magazine, the shearing being carried out by moving a cutting blade mounted on a blade-bearing saddle forward and backward rectilinearly within a chassis, the blade-bearing saddle comprising:
at an upper portion thereof, two openings that are substantially rectangular: a front opening, closed at a lower portion thereof, intended for cutting a base end section of the fuel elements and a rear opening, open at a lower portion thereof, that is temporarily closable by a movable flap and intended for cutting the fuel elements,
wherein the magazine has a lower part having a variable cross-section and an upper, openable part having a constant rectangular cross-section, and
wherein the movable flap is articulated about a horizontal axis perpendicular to the movement of the saddle, and said flap is supported on sides thereof by an arm beneath the flap and terminated by a roller on a ramp fixed to the chassis.

18. A device for shearing fuel elements placed vertically in a magazine, the shearing being carried out by moving a cutting blade mounted on a blade-bearing saddle forward and backward rectilinearly within a chassis, the blade-bearing saddle comprising:
- at an upper portion thereof, two openings that are substantially rectangular: a front opening, closed at a lower portion thereof, intended for cutting a base end section of the fuel elements and a rear opening, open at a lower portion thereof, that is temporarily closable by a movable flap and intended for cutting the fuel elements,
- wherein a rear face of a bottom portion can adopt an oblique position, compressing the fuel elements placed in the magazine, through the action of a jack pushing said rear face via a ball joint, and
- wherein the movable flap is articulated about a horizontal axis perpendicular to the travel of the saddle, and said flap is supported on sides thereof by an arm beneath the flap and terminated by a roller on a ramp fixed to the chassis.

19. A device for shearing fuel elements placed vertically in a magazine, the shearing being carried out by moving a cutting blade mounted on a blade-bearing saddle forward and backward rectilinearly within a chassis, the blade-bearing saddle comprising:
- at an upper portion thereof, two openings that are substantially rectangular; a front opening, closed at a lower portion thereof, intended for cutting a base end section of the fuel elements and a rear opening, open at a lower portion thereof, that is temporarily closable by a movable flap and intended for cutting the fuel elements,
- wherein lateral faces of the lower portion of the magazine can be displaced while remaining vertical through the action of a plurality of short-travel jacks, and
- wherein the movable flap is articulated about a horizontal axis perpendicular to the travel of the saddle, and said flap is supported on sides thereof by an arm beneath the flap and terminated by a roller on a ramp fixed to the chassis.

* * * * *